(12) United States Patent
Ander et al.

(10) Patent No.: US 8,048,522 B2
(45) Date of Patent: Nov. 1, 2011

(54) PRESSURE-SENSITIVE ADHESIVE MATERIALS AND SEALING MATERIALS WITH A THREE-DIMENSIONAL STRUCTURE, AS WELL AS PROCESSES FOR THEIR PRODUCTION

(75) Inventors: Hansjörg Ander, Bendorf (DE); Heinz Josef Röser, Gappenach (DE)

(73) Assignee: Lohmann GmbH & Co., KG, Neuwied (DE)

( * ) Notice: Subject to any disclaimer, the term of this patent is extended or adjusted under 35 U.S.C. 154(b) by 0 days.

(21) Appl. No.: 10/799,724

(22) Filed: Mar. 15, 2004

(65) Prior Publication Data
US 2004/0202796 A1  Oct. 14, 2004

(30) Foreign Application Priority Data
Mar. 15, 2003 (DE) .................. 103 11 433

(51) Int. Cl.
*B32B 7/12* (2006.01)
(52) U.S. Cl. ............. 428/355 AC; 428/343; 428/355 R; 428/355 EP; 428/214; 428/215; 428/220
(58) Field of Classification Search .................. 277/626, 277/431; 428/66.4, 355 R, 355 AC, 355 EP
See application file for complete search history.

(56) References Cited

U.S. PATENT DOCUMENTS

| | | | | |
|---|---|---|---|---|
| 3,617,362 A * | 11/1971 | Bemmels et al. | ......... | 428/355 R |
| 3,959,052 A * | 5/1976 | Stanek | ............. | 156/86 |
| 4,113,914 A * | 9/1978 | Doss | ......... | 428/355 EP |
| 4,277,532 A * | 7/1981 | Czepel et al. | ........... | 442/150 |
| 4,388,448 A * | 6/1983 | Melby | ............ | 525/327.3 |
| 4,414,275 A * | 11/1983 | Woods | ............ | 428/352 |
| 4,731,273 A * | 3/1988 | Bonk et al. | .......... | 428/57 |
| 4,814,215 A * | 3/1989 | Lautenschlaeger et al. | . | 428/41.5 |
| 5,118,567 A * | 6/1992 | Komiyama et al. | ......... | 428/345 |
| 5,229,212 A * | 7/1993 | Reed | ............. | 428/429 |
| 5,326,605 A * | 7/1994 | Ono et al. | ........... | 428/41.2 |
| 5,599,601 A * | 2/1997 | Polski et al. | ........... | 428/40.1 |
| 5,599,622 A * | 2/1997 | Kinzer et al. | ........... | 428/355 EP |
| 5,741,014 A * | 4/1998 | Wambeke et al. | ............ | 277/312 |
| 6,293,037 B1 * | 9/2001 | Spada et al. | ............. | 40/638 |

\* cited by examiner

*Primary Examiner* — Alicia Chevalier
*Assistant Examiner* — Anish Desai
(74) *Attorney, Agent, or Firm* — Birch, Stewart, Kolasch & Birch, LLP

(57) ABSTRACT

Process for the production of pressure sensitive adhesive materials or sealing materials having a defined cross-sectional geometry and three-dimensional structure, especially in the form of rolled or continuous materials, which comprises the following steps:

(a) preparing a polymerizable mass (5);
(b) applying this mass to an adhesive support (1, 2, 3, 6) in web form which, in longitudinal direction, has one or more depressions (30) having a predetermined cross-sectional contour, or filling said mass into one or more contour-imparting, adhesive hollow bodies (11) which have a predetermined cross-sectional contour;
(c) feeding the mass to a curing unit (7) for curing the polymerizable mass (5).

14 Claims, 2 Drawing Sheets

PRESSURE-SENSITIVE ADHESIVE MATERIALS AND SEALING MATERIALS WITH A THREE-DIMENSIONAL STRUCTURE, AS WELL AS PROCESSES FOR THEIR PRODUCTION

This nonprovisional application claims priority under 35 U.S.C. §119(a) on patent application Ser. No. 103 11 433.5 filed in GERMANY on Mar. 15, 2003, the entire contents of which are hereby incorporated by reference.

The invention relates to processes for the production of pressure sensitive adhesive materials or sealing materials having defined cross-sectional geometry and three-dimensional structure, especially in the form of rolled materials or continuous materials. The invention further relates to pressure sensitive adhesive materials and sealing materials which have the aforementioned properties, as well as to the use thereof for adhesive bonding or sealing.

According to the presently known processes, pressure sensitive adhesives are manufactured exclusively as planar (or flat) systems in the form of one- or double-side adhesive tapes, the thickness of such systems generally lying between 15 μm and 4000 μm. The systems are produced by coating carrier materials or process films with a pressure sensitive adhesive, the width being approx. 500 to 2000 mm. The pressure sensitive adhesive is applied from solution (aqueous or organic solvent) or by a solvent-free process. The large rolls ("jumbo rolls") thus obtained are subsequently processed to corresponding narrow rolls or coils.

The possible uses of these known, flat pressure sensitive adhesive systems are, however, limited. For many uses, it is desirable or necessary that the pressure-sensitive adhesive systems used for the adhesive joining of adherends or the sealing materials used for sealing have a different geometry from that of the known flat materials. These materials have a thickness which—relative to their surface dimensions—is only small and they are therefore to be regarded as almost two-dimensional bodies.

It was thus an object of the present invention to indicate pressure sensitive adhesive systems which obviate the disadvantages, especially with regard to the limited application possibilities, of the known flat systems or materials. A further object was to indicate processes of production by which such improved pressure sensitive adhesive materials and sealing materials can be obtained in a simple and economical manner. A still further object was, by means of such processes, to enable the manufacture of pressure sensitive adhesive materials and sealing materials which can have almost any geometric cross-sectional shape desired.

The solution to these and other problems is surprisingly achieved by processes according to claim 1 and by pressure sensitive adhesive materials or sealing materials according to claim 14, as well as by the embodiments described in the dependent claims.

The processes according to the invention enable the production of pressure sensitive adhesive materials or sealing materials which have a defined cross-sectional geometry and three-dimensional structure, especially in the form of rolled or continuous materials. These processes are characterized, inter alia, by the fact that despite their complex structure, these materials can be manufactured as rolled stock or coiled stock in a simple manner.

The terms "cross-sectional geometry" and "three-dimensional structure" are understood to mean, in particular, that the geometry of these materials, relative to their cross-section, deviates from the flat two-dimensional geometry of the known adhesive tapes and that the structure, especially the surface, of the inventive materials is not planar or flat but has a defined, three-dimensional contour.

The inventive systems may, for example, be configured as continuous systems which have a circular or triangular, quadrangular or polygonal cross-section and whose surface is correspondingly bent, curved or provided with edges. More complicated profiles can, however, be obtained as well, e.g. materials of V-shaped cross-section.

A process of production according to the invention at least comprises the following steps (and may optionally contain further steps):

(a) Preparing a polymerizable mass;
(b) applying this mass to an abhesive support in web form which, in longitudinal direction, has one or more depressions having a predetermined cross-sectional contour, or filling said mass into one or more contour-imparting, abhesive hollow bodies which have a predetermined cross-sectional contour;
(c) feeding the mass to a curing unit for curing the polymerizable mass The cross-sectional geometry and the three-dimensional structure of the pressure sensitive adhesive materials or sealing materials thus obtained are substantially determined by the said cross-sectional contour of the support or the hollow body used.

The polymerizable material used (step (a)) is preferably a radiation-polymerizable mass. With particular preference, the polymerizable material used is a mixture of at least one compound from the group of acrylates and methacrylates and one or more radiation-sensitive initiator(s), or a material containing such a mixture. According to a preferred embodiment, the material is produced by using a combination of at least two compounds from the group of acrylates or methacrylates.

The polymerizable mass may also contain acrylic acid or/and methacrylic acid monomers, preferably in combination with (meth)acrylate(s).

Furthermore, it is also possible to use as polymerizable mass a polymer syrup of acrylates and/or methacrylates which contains one or more radiation-sensitive initiators. The radiation-sensitive initiator(s) is/are admixed during the manufacture of the polymerizable material.

A polymer syrup is understood to mean a viscous polymerizable mass, especially a polymerizable mass of a viscosity of 0.5 to 10 Pa·s. Which viscosity is suitable in an individual case is inter alia dependent on the type of material and the thickness of the later product and can be established by simple preliminary tests. Higher viscosities enable the manufacture of materials that have a greater layer thickness since the mass flows to a lesser extent and has a higher inherent stability.

Generally, a polymerizable mass consists of 95 to 99.5%-wt monomer(s) or/and oligomer(s), as well as 0.5 to 5% photoinitiator(s), and, if required, solvents.

One or more of the following additives may optionally be added to the polymerizable mass:
Resins (5 to 100%-wt); inorganic fillers (0.1 to 10%-wt.); flame-proofing agents (0.1 to 10%-wt); colourants (0.1 to 2%-wt); cross-linking agents (0.05 to 5%-wt).

Each percentage relates to the sum of monomers/oligomers and photoinitiators (=100%).

As acrylates or methacrylates the following groups are taken into consideration in particular: (meth)alkyl acrylates, aromatic (meth)acrylates, as well as alicyclic, polycyclic and heterocyclic (meth)acrylates.

Some (meth)acrylates which are particularly suitable for the production of the polymerizable mass are shown in the following, by way of example:

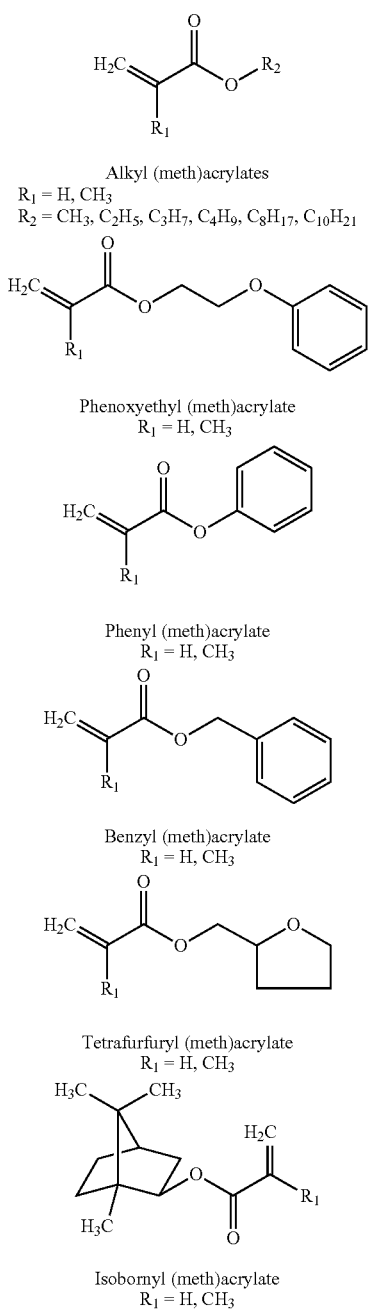

In addition, to produce a polymerizable mass it is also possible to use other compounds which are subject to free-radical polymerization. Substances suitable for this purpose are in principle known to those skilled in the art and may be selected, in particular, from the groups of the di-, tri- and higher acrylates and methacrylates, the hydroxy and amino acrylates, the vinyl ethers and vinyl esters, as well as other unsaturated compounds. These compounds may be used both singly as well as in combination.

Examples of the aforementioned compounds are, in particular, the following: hexanediol di(meth)acrylate, trimethylol-propane tri(meth)acrylate, pentaerythritol tetra(meth)acrylate, hydroxyethyl (meth)acrylate, 2-aminoethyl (meth)acrylate, as well as vinyl acetate and styrene. Furthermore, to produce a polymerizable mass it is also possible to use heterocyclic compounds which, by means of radiation and in the presence of appropriate initiators, can be converted to polymers, preferably in combination with one or more of the above-mentioned (meth)acrylates.

Heterocyclic compounds considered are, in particular: epoxides, especially preferably epoxides based on bisphenol A, as well as corresponding epoxide resins, additionally epoxide acrylates in monomeric and polymeric form.

A monomeric epoxide acrylate is a monomer which is polymerized into a polyacrylate chain which results in a polyacrylate with epoxide side chains (copolymer of acrylate and monomeric epoxide acrylate) which can be post-crosslinked via a thermal or radiation-induced reaction.

A polymeric epoxide acrylate is, in particular, a homopolymer of glycidyl (meth)acrylate which is admixed to the polyacrylate and which in a second step cross-links the acrylate chains (see above).

A radiation-sensitive initiator is understood to mean a compound which is capable of forming radicals when exposed to radiation (particularly, visible light or ultraviolet radiation), which radicals are then capable of initiating a polymerization reaction with the unsaturated or heterocyclic compounds present in the reaction mixture.

Examples of radiation-sensitive initiators are, in particular, the following compounds:

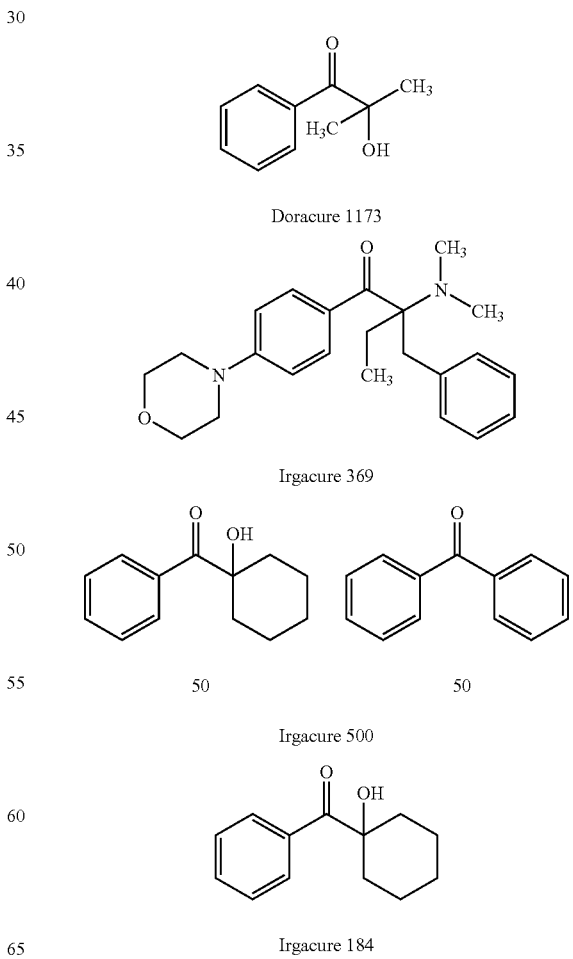

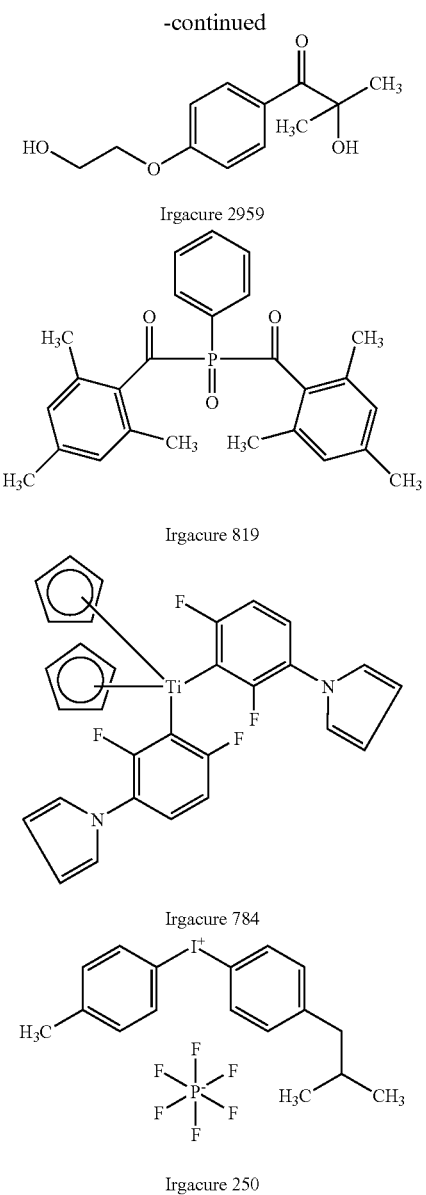

(Irgacure, Doracure: CIBA Spezialitätenchemie, Basel)

According to step (b) of the inventive process, the polymerizable mass is applied to an abhesive support in web form which, in longitudinal direction, has one or more depressions with a pre-determined cross-sectional contour; alternatively, the polymerizable mass is filled into one or more contour-imparting, abhesive hollow bodies with a predetermined cross-sectional contour. The said depressions are arranged in the form of longitudinal grooves or channels, preferably substantially parallel to each other, and separated from each other in the longitudinal direction by corresponding protrusions (as shown in FIG. 1 and FIG. 3, for example).

The said support in web form preferably consists of a material which is abhesive to adhesive materials and sealing materials, for example EPDM (ethylene-propylene diene monomer), silicones or Teflon, or it is coated with such a material.

It is particularly advantageous to use a continuous band or belt as the support in web-form; this may also be a continuous chain belt made, for instance, of Teflon or being coated with Teflon. The support in web form or the belt has one or several depressions in longitudinal direction, the profile of which corresponds to the desired final contour of the pressure sensitive adhesive product or the sealing material.

If the support has several depressions, they are arranged substantially parallel to each other. These depressions may optionally also have different contours so that by using one single web-shaped support it is possible to obtain pressure sensitive adhesive products or sealing materials which have different cross-sectional contours.

If a continuous belt is used, a process variant is particularly advantageous wherein the materials thus obtained are subsequently further processed to rolls or coils by means of a wind-up unit.

Application of the polymerizable mass onto the said support can be accomplished by known application methods such as, for example, doctor knife techniques or by metering valves. Such application techniques may also be used in combination.

Taken into consideration as contour-imparting, abhesive hollow bodies are, in particular, tubular materials of silicone or Teflon, or other tubular materials of any desired shape, provided their interior side has been rendered abhesive. The polymerizable mass is preferably filled into the tubular shell or enveloping materials by means of a filling unit. The length of the tubular materials can be freely chosen, a maximum length of 3 m being preferred.

According to step (c) of the inventive processes, the mass which has been applied or filled in is subsequently fed to a curing unit to cure the polymerizable mass. In the process, the mass is converted to a pressure sensitive adhesive, a sealant, or a pressure sensitive adhesive sealant. Sealants or sealing materials are understood to mean such materials as do not permit diffusion of gases and/or liquids.

Curing is preferably accomplished by using one or more radiation units. A radiation unit may optionally be provided with one or several UV lamps, daylight lamps, or electron beam sources; combinations of these radiation sources may also be used to advantage. Ultraviolet radiation is used with particular preference. The radiation sources are preferably arranged in the radiation unit such that the material to be cured is irradiated with the highest efficiency.

To achieve a conversion that is as quick and complete as possible, it is generally necessary to render the radiation unit(s) inert by means of inert gases such as nitrogen or carbon dioxide, for example; devices and methods suitable for this purpose are known to those skilled in the art.

In the case of the process variant wherein the polymerizable mass is filled into tubular materials, it is possible to dispense with the inertization of the radiation unit(s) since the filled tubes constitute systems which are closed from the environment. Under these conditions, there is no danger of atmospheric oxygen inhibiting the polymerization.

The invention further relates to pressure sensitive adhesive materials as well as sealing materials, said materials having a three-dimensional structure and a defined cross-sectional contour. The invention also relates to pressure sensitive adhesive materials which at the same time have sealing properties, as well as sealing materials which simultaneously have pressure-sensitive adhesive properties.

More particularly, the invention relates to pressure sensitive adhesive materials and sealing materials having a round, circular, semi-circular, oval, elliptic, triangular, quadrangular (square, rectangular), polygonal, angled (e.g. V-shaped) or irregular cross-sectional contour. The materials according to the invention preferably have a thickness of 0.5 to 50 mm, with particular preference of 0.5 to 10 mm. The width can be chosen as desired, depending on the intended purpose. If square materials are used, a ratio of width:height in the range of 1:1 to 1:3 is preferred. In the case of triangle or half-round materials, the height is preferably maximally 50 mm, with particular preference up to 10 mm, the width in each case being arbitrary. Materials of such geometries can not be produced by other processes.

According to a particularly preferred embodiment, the pressure sensitive adhesive materials and sealing materials are produced as continuous systems, i.e. as rolled or continuous material, especially in the form of strings, strands or strips. Conventional sealing materials, especially non-adhesive sealing strings (e.g. hemp or asbestos strings) and seal tapes (e.g. Teflon tapes) are not encompassed by the invention.

The pressure sensitive adhesive materials and sealing materials can advantageously be obtained by polymerization of (meth)acrylates, as described above.

The pressure sensitive adhesive materials and sealing materials according to the invention can be used in various technical fields for permanent or releasable adhesive bonding of objects, respectively for sealing, especially for sealing joints or flanged joints or panes.

BRIEF DESCRIPTION OF THE DRAWINGS

The invention will in the following be illustrated in more detail by means of drawings and embodiments.

Figure 1:
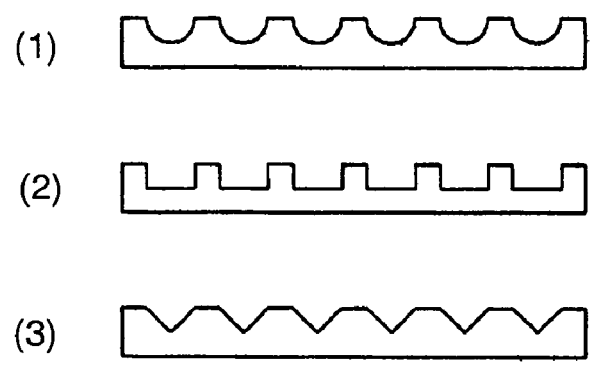
FIG. 1 shows, by means of three examples (1, 2, 3), possible contours (in cross-section) of the lengthwise arranged depressions of the above-mentioned supports which are rendered abhesive and which can be used in step (b) of the inventive process. Web (1) enables the manufacture of half-round materials or sealing materials as continuous systems with a half-round or semicircular cross-sectional profile, web (2) enables the manufacture of such systems with a rectangular or square cross-sectional profile, web (3) enables the manufacture of such systems with a triangular cross-sectional profile.

An abhesive continuous belt (6), which is provided with contours or profiles (for instance as shown in FIG. 1) is moved continuously in the direction of the arrows. Using a metering unit (4), or several of such metering units, arranged side by side, a polymerizable mass (5) is applied into the contours or profiles of the abhesive belt (6). Due to the advance movement of the belt (6), the applied polymerizable mass (5) subsequently enters the region of a radiation unit (7) wherein the curing of the mass takes place. The cured pressure sensitive adhesive or sealing materials (9) are subsequently wound up to rolls or coils in a wind-up unit (8).

Figure 2:
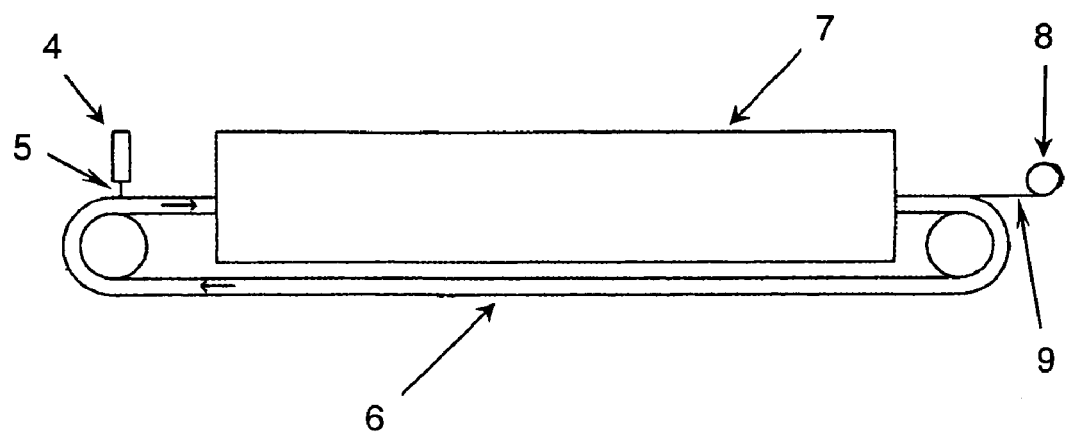
FIG. 2 shows, in longitudinal section, that is, in side view, the schematic structure of a plant for the production of the inventive pressure sensitive adhesive and sealing materials.
Figure 3:
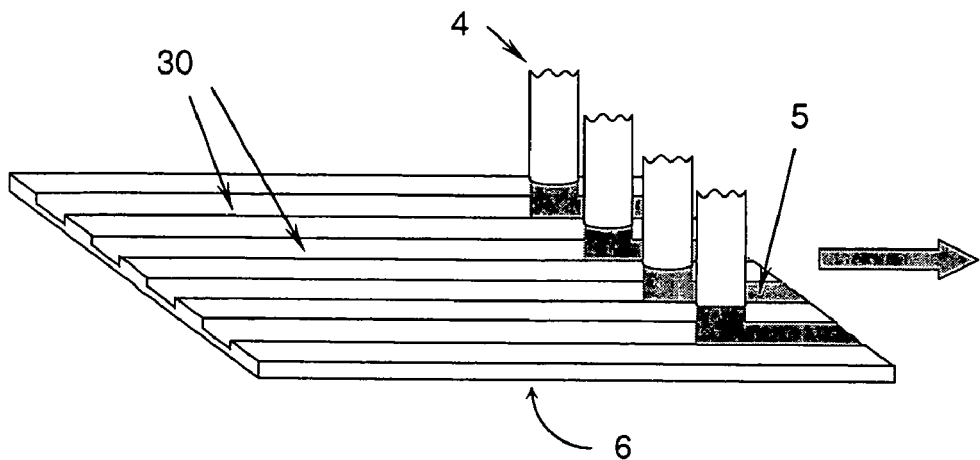

FIG. 3 shows, in perspective, schematic representation, the process of applying the mass (in the region of the metering unit (4) in FIG. 2) in detail. By means of a plurality of metering units, arranged side by side, the polymerizable mass (5) is applied into the contours, respectively profiles 30) of the abhesive support (6) in web form. Due to the advance transport of the web (direction of arrow, pointing right) the applied mass arrives at the irradiation unit (not shown).

If several metering units are arranged side by side, these may optionally serve to apply different polymerizable materials, for instance materials of different monomer composition.

Figure 4:
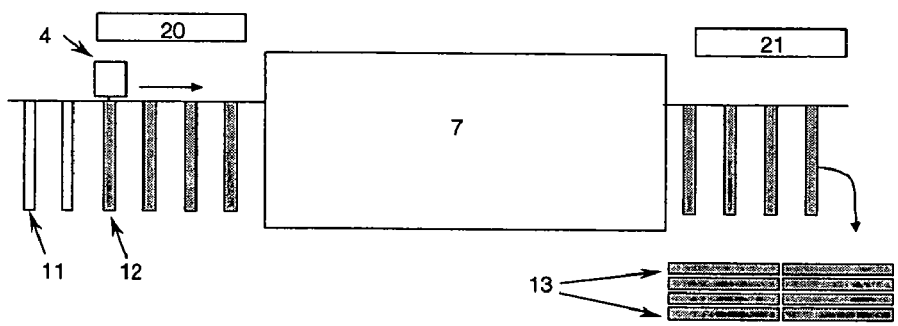

FIG. 4 shows, in longitudinal section, that is, in side view, the schematic structure of a plant for producing the inventive pressure sensitive adhesive materials and sealing materials by filling a polymerizable mass in tubular, contour-imparting hollow bodies (11) of defined length. Tubular, contour-imparting shells or envelopes (11) are transported by intermittent advance in the direction of the arrow (pointing right). In the region of a filling station (20), a polymerizable mass is filled by means of one or more metering units (4) from above into tubular, contour-imparting media (11). By advance transport, the filled shells or envelopes (12) enter an irradiation unit (7) wherein curing of the polymerizable mass takes place, and finally they arrive at a discharge station (21). There, the contoured, three-dimensional pressure sensitive adhesive and sealing materials (13), which are of a predetermined length and are enveloped with an abhesive shell material, are released from the direction of transport.

If several dosage units are used side by side, these may optionally serve to fill in different polymerizable materials, e.g. materials which are of different monomer composition.

Figure 5:
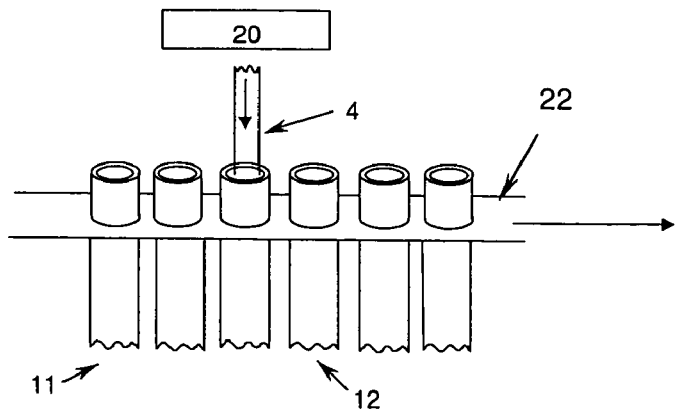

FIG. 5 shows, in longitudinal section, that is, in side view, a detailed schematic representation of the filling station (20) and metering unit (4) shown in FIG. (4). In the filling station (20), a polymerizable mass is filled from above, by means of a metering unit (4), into the tubular, contour-imparting shells or envelopes (11) (arrow). The filled tubes are conveyed further to an irradiation unit (arrow pointing right) by means of a transport device (22).

As can be seen from this example, the present invention enables the simple production of pressure sensitive adhesive materials and sealing materials with profiles or contours of almost any desired shape, so that a plurality of new application possibilities result as compared to the known, flat materials.

EXAMPLE a) Preparation of a Polymer Syrup

In a glass vessel there is placed a mixture of 155%-wt. of 2-ethylhexyl acrylate, 85 parts by weight of acrylic acid, 55 parts by weight of butyl acrylate, and 1.4 parts by weight of Irgacure 819. Subsequently, this is washed for 5 min with protective gas, and the reaction mixture is irradiated until a viscosity of 3 Pas results.

b) Preparation of a Three-Dimensional Adhesive Tape

The polymer syrup according to a) is processed to a structured pressure-sensitive adhesive tape by using a plant according to FIG. 2. As the process belt, a band according to FIG. 1(3) is used. The belt velocity lies within the following ranges:

| Tape thickness [μm] | Belt velocity [m/min] |
| --- | --- |
| 500 | 2-5 |
| 1000 | 1-3 |
| 2000 | 0.5-2 |
| 4000 | 0.3-1 |

The UV sources used are lamps having a power of 1 to 150 W/cm. In the embodiment examples, the power was typically in the range of from 80 to 150 W/cm.

As a rule, the processing temperature is room temperature (approx. 15 to 30° C.). The product may, however, heat up automatically due to the reaction heat released.

The invention claimed is:

1. A pressure-sensitive adhesive material or a sealing material which has a three-dimensional structure and a defined cross-sectional contour, wherein said material is present in a form of strings, strands or strips, wherein said strings, strands or strips have a round, semicircular, oval, elliptical, triangular, quadrangular, V-shaped, polygonal or irregular cross-sectional contour and a surface that is bent, curved or provided with edges corresponding to said cross-sectional contour, and wherein said material consists of a polymerizable mass produced by polymerization and said polymerizable mass consists of at least one compound selected from the group consisting of aromatic (meth) acrylates, alicyclic (meth)acrylates, polycyclic (meth) acrylates, heterocyclic (meth) acrylates, and epoxide acrylates, along with at least one compound selected from the group consisting of acrylic acid and methacrylic acid or at least one compound selected from the group consisting of vinyl ethers, vinyl esters, and styrene, and a radiation sensitive initiator in an amount ranging from 0.5 to 5% wt. of the polymerizable mass, wherein said radiation sensitive initiator is selected from the group consisting of 2-hydroxy-2-methyl-1-phenyl-1-propanone, 1-hydroxy-cyclohexyl-phenyl-ketone, iodonium, (4-methylphenyl) [4-(2-methylpropyl)-phenyl]hexafluorophosphate (1-), 2-benzyl-2-(dimethylamino)-1-[4-(4-morpholinyl)phenyl]-1-butanone, a mixture of 50%-wt of 1-hydroxy-cyclohexyl-phenyl-ketone and 50%-wt of benzophenone, bis[2,6-difluoro-3-(1H-pyrrol-1-yl)phenyl]titanium, phosphine oxide phenyl-bis-(2,4,6-trimethyl benzoyl and 2-hydroxy-1-[4-2(hydroxyethoxy)phenyl]-2- methyl-1-propanone.

2. The material according to claim 1, wherein the compound is selected from the group consisting of benzyl (meth)acrylate, phenyl (meth)acrylate, phenoxyethyl (meth)acrylate, tetrafurfuryl (meth)acrylate, and isobornyl (meth) acrylate.

3. The material according to claim 1, wherein the vinyl ester is vinyl acetate.

4. The material according to claim 1, wherein the epoxide acrylate is a homopolymer of glycidyl (meth)acrylate.

5. The material according to claim 1, wherein the material is present as rolled or continuous material.

6. The material according to claim 1, wherein said strings, strands, or strips have a thickness of 0.5 to 10 mm.

7. The material according to claim 1, wherein a ratio of width to height of said strings, strands, or strips having a quadrangular cross-sectional contour is in a range of 1:1 to 1:3.

8. The material according to claim 1, wherein said strings, strands or strips have a thickness of 0.5 to 50 mm.

9. The material according to claim 1, wherein said material is produced by applying said polymerizable mass to an abhesive support in web form, said support having one or more depressions in a longitudinal direction of said support, wherein said depressions have a pre-determined cross-sectional contour which determines said round, semi-circular, oval, elliptical, triangular, quadrangular, V-shaped, polygonal or irregular cross-sectional contour of the material.

10. The material according to claim 1, wherein said material is produced by:
    filling said polymerizable mass into one or more abhesive hollow bodies having an inner cross-sectional contour which determines said round, semi-circular, oval, elliptical, triangular, quadrangular, V-shaped, polygonal or irregular cross-sectional contour of the material when the polymerizable mass is filled into the hollow bodies and cured.

11. The material according to claim 9, wherein said polymerizable mass has a viscosity in the range of 0.5 to 10 Pa·s.

12. The material according to claim 10, wherein said polymerizable mass has a viscosity in the range of 0.5 to 10 Pa·s.

13. A method of permanently or releasably adhesively bonding of objects, comprising the step of:
    applying the pressure sensitive adhesive materials according to claim 1 between the objects to be bonded.

14. A method of sealing joints or flanged joints or panes, comprising the step of:
    applying the sealing materials according to claim 1 to the joints or the flanged joints or the panes to be sealed.

* * * * *